United States Patent [19]

Reisinger

[11] 4,006,302
[45] Feb. 1, 1977

[54] SWITCHING ARRANGEMENT FOR EXTENDING THE RECEIVER STOP PULSE LENGTH IN TIME DIVISION MULTIPLEX TRANSMISSION

[75] Inventor: Konrad Reisinger, Zorneding, Germany

[73] Assignee: Siemens Aktiengesellschaft, Munich, Germany

[22] Filed: Feb. 13, 1976

[21] Appl. No.: 658,121

[30] Foreign Application Priority Data

Mar. 13, 1975 Germany ............... 2511056

[52] U.S. Cl. .................. 178/50; 179/15 BS
[51] Int. Cl.$^2$ .......................... H04L 5/00
[58] Field of Search ............ 178/50, 69.5 R; 179/15 AP, 15 AQ, 15 BA, 15 BS, 15 BV

[56] References Cited

UNITED STATES PATENTS

| | | | |
|---|---|---|---|
| 3,463,887 | 8/1969 | Ito ................................. | 179/15 BS |
| 3,482,044 | 12/1969 | Kaneko ........................... | 178/53 |
| 3,525,813 | 8/1970 | Taylor et al. ................... | 179/15 BS |

*Primary Examiner*—Thomas A. Robinson

[57] ABSTRACT

A switching arrangement for a data transmission system is described wherein the switching arrangement extends the receiver stop pulse length in time division multiplex transmissions of telegraph signals on a character frame basis. The character frame contains one start pulse, a number m code bits and one stop pulse. The time division multiplex (TDM) signal is applied to a first bistable circuit, and the output signal of the first bistable circuit is applied to a second bistable circuit from which a data signal is emitted to a data sink. A shift register is provided having no fewer than $m+3$ storage cells in which a first binary digit is stored if a stop signal is applied by means of parallel input terminals to the shift register. Timing pulses applied to the shift register are received in a pulse input. A shift register further includes a serial input terminal over which a second binary digit is read-in where no stop signal is present. A gate having inputs to which are applied the input signal of the $m+3^{th}$ storage cell of the shift register and the output signal of the first bistable circuit. The gate produces a stop signal. A counter is provided to which are applied the stop signal as a count signal and the output signal of the $m+3^{th}$ storage cell as a reset signal. The counter produces counter reading signals indicating the reading of the counter. A clock generator or more phase shifted signals are emitted in a square wave pulse form of which one half the unit element length are displaced in proper phase relation by fractions of the unit element length. Phase shifted clock signals as a function of the reading of the counter are used for timing the second bistable circuit.

2 Claims, 3 Drawing Figures

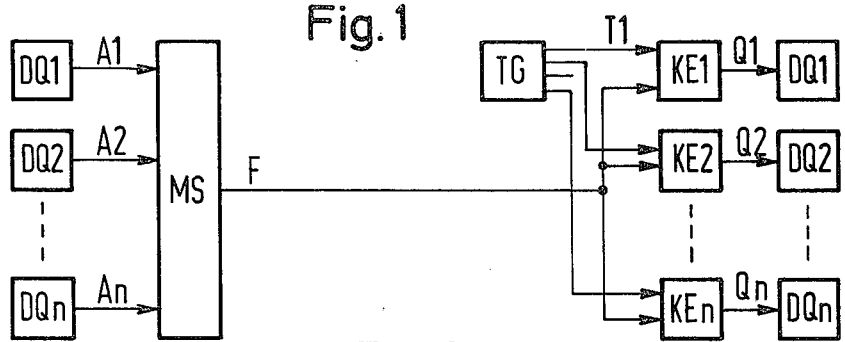
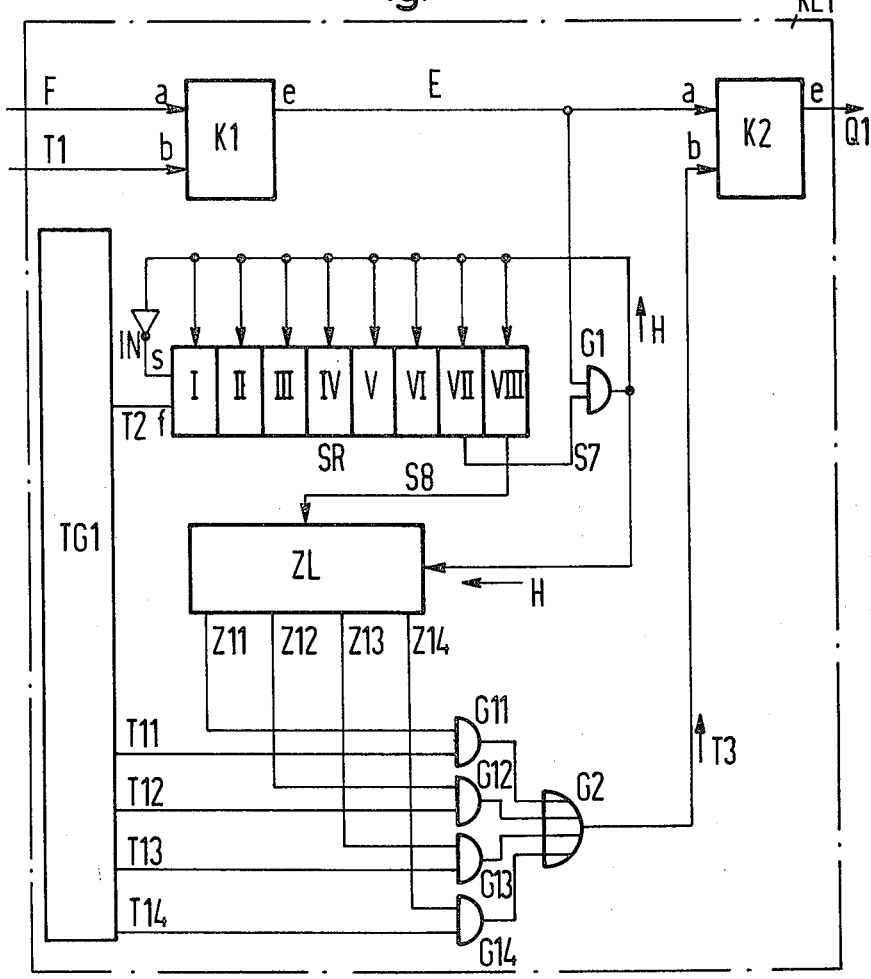

4,006,302

SWITCHING ARRANGEMENT FOR EXTENDING THE RECEIVER STOP PULSE LENGTH IN TIME DIVISION MULTIPLEX TRANSMISSION

BACKGROUND OF THE INVENTION

The invention relates to a switching arrangement for extending the receive-side stop pulse length in time division multiplex (TDM) transmission of telegraph signals on a character frame basis. Each character frame comprises one start pulse, m code bits and one stop pulse.

As is generally known, a TDM signal may be applied to two or more channel units in the receiver by which the transmitted data signals are recovered.

It is an object of the invention to provide channel units of little complexity and which can be used in particular advantage if only comparatively few data sources are provided at the transmitter and relatively few channel units and corresponding data sinks are provided at the reciever.

SUMMARY OF THE INVENTION

In accordance with the principles of the invention the foregoing and other objects are obtained by providing a shift register having no fewer than $m+3$ storage cells in which a first binary digit is stored if a stop signal is applied via parallel input terminals. Clock pulses are applied as shift register clock pulses to the shift register via a clock pulse input. The shift register has a serial input terminal over which a second binary digit is read in whenever no stop signal is present. A gate is likewise provided to which are applied the output signal of the $m+2$th storage cell of the shift register and the output signal of the first bistable circuit and which, at its output, provides the stop signal. The stop signal is applied to a counter as a counting signal and the output signal is applied to the $m+3$th storage cell as a reset signal. The counter produces counter reading signals signalling the reading of the counter. Two or more phase-shifted clock signals are produced by a clock pulse generator whose square-wave pulses have one-half the unit element length and are displaced in proper phase relation by fractions of the unit element length; one of the phase-shifted clock signals is a function of the reading of the counter for timing the second bistable circuit.

The circuit arrangement in accordance with the teachings of the invention is characterized by comparatively little complexity and by the fact that it can be produced using standardized logic elements.

BRIEF DESCRIPTION OF THE DRAWINGS

The principles of the invention will be more readily understood by referring to the description of a preferred embodiment given hereinbelow with reference to FIGS. 1 through 3 wherein like components are indicated by like reference numerals and wherein:

FIG. 1 is a block-schematic diagram illustrating a TDM data transmission system, FIG. 2 is a schematic diagram illustrating the details of a channel unit shown schematically in FIG. 1 and FIG. 3 contains time-waveform diagrams illustrating signals appearing during the operation of the system of FIG. 1.

DETAILED DESCRIPTION OF THE DRAWINGS

Figure 3:
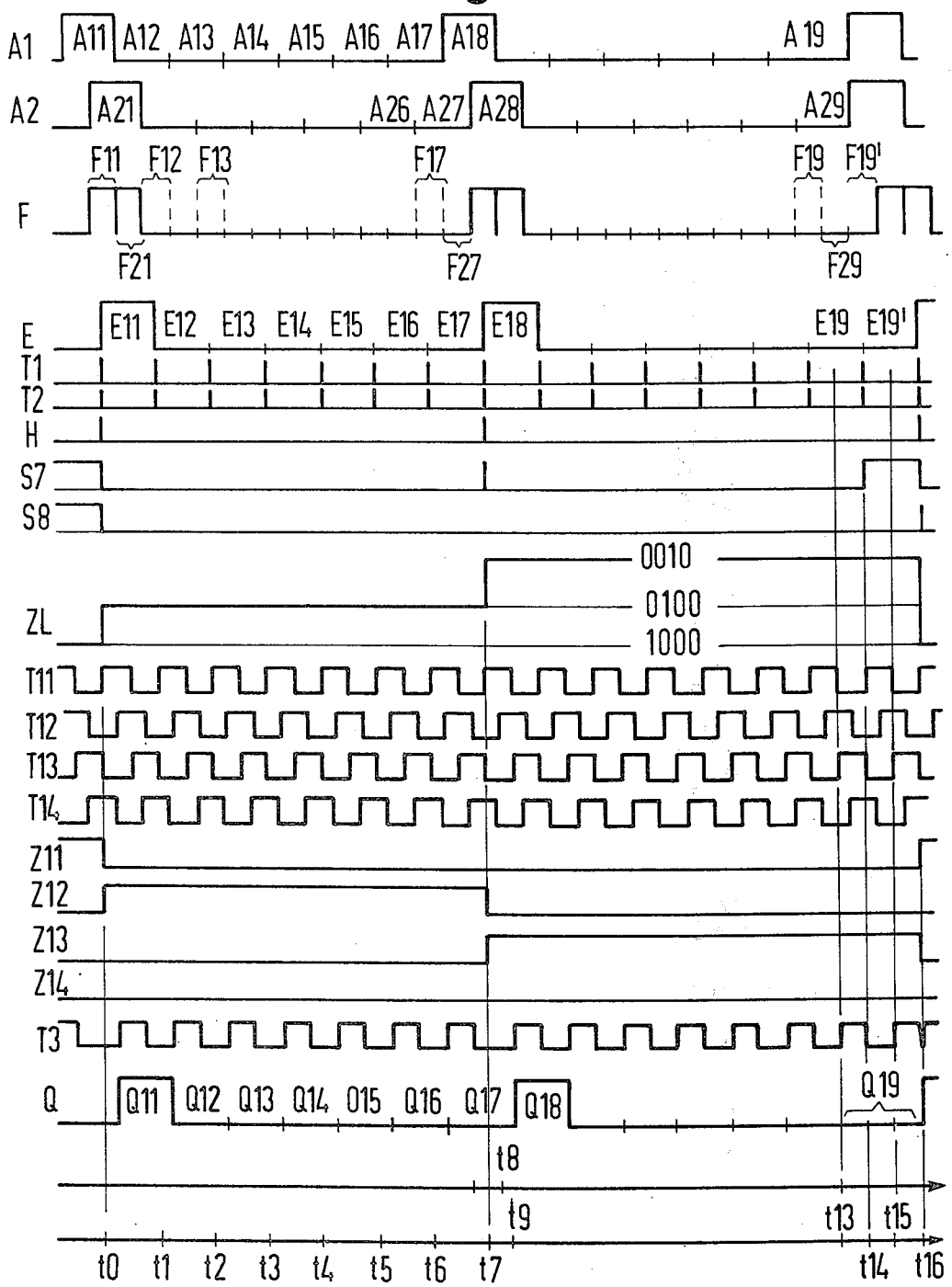

FIG. 1 shows data sources DQ1, DQ2 ... DQn supplying the data to be transmitted to a send-side multiplexer MS which provides a TDM signal F from its output. Teleprinters, teletypewriter exchanges, tape readers, card readers, may be provided as data sources. The TDM signal F is transmitted to the receiver via transmission means not shown, where clock generator TG, channel units KE1, KE2 ... KEn and data sinks DQ1, DQ2 ... DQn are located. Teleprinters, teletypewriter exchanges, tape punches, key punches, and the like may be provided as data sinks. For simplicity, only three data sources are illustrated at the transmitter and at the receiver likewise only three channel units and three data sinks, though in practice greater numbers of these devices may be used.

FIG. 2 provides details of the channel unit KE1. The other channel units KE2 ... KEn of FIG. 1 have a similar construction. Channel unit KE1 comprises bistable circuits K1, K2, clock generator TG1, inverter IN, shift register SR, counter ZL, and gates G1, G2, G11, G12, G13, G14. Bistable circuits K1 and K2 have two inputs $a$ and $b$ each and one output $e$ over which they provide a zero signal or a one signal, respectively, throughout the duration of their zero condition. A transition from the zero condition to the one condition occurs with a one signal at input $a$ and a positive pulse edge at input $b$. A transition from the one condition to the zero condition occurs with a zero signal at input a and likewise with a positive pulse edge at input $b$.

Shift register SR has eight storage locations I, II, III, IV, V, VI, VII, VIII. The storage cells receive incremental pulses of signal T2 via input $f$ and are set to their zero conditions if a signal H=1 is applied from the output of gate G1 via the parallel inputs p. If a one signal is applied via serial input $s$ the first storage cell I is set to the one condition. The VIIth or VIIIth storage cell produces signal S7 or S8, respectively.

Counter ZL counts the pulses of signal H and is reset to counter reading 1000 by signal S8. Counter readings 1000, 0100, 0010, and 0001 are output to gates G11, G12, G13, G14 via the outputs of counter ZL.

FIG. 3 shows several signals of the system of FIG. 1. The abscissas refer to the time $t$. The two binary digits of binary signals are given the reference numerals 0 and 1. For simplicity, only two data sources DQ1 and DQ2 are implied providing the two signals A1 or A2, respectively. A first signal is signalled by start pulse A11, information unit elements A12, A13, A14, A15, A16 and by stop pulse A17. A second signal is signalled by start pulse A18, by five other information unit elements and by stop pulse A19. A further signal is signalled by start pulse A21, by five other information unit elements and by stop pulse A27. Finally, start pulse A28 and stop pulse S29 are associated with a fourth signal.

Multiplex signal F is produced on the send side by multiplexer MS (FIG. 1), its signal components (F11, F12, F13 ... F17) correspond to unit elements A11, A12, A13 ... A17. Similarly, signal components F21 ... F27 correspond to unit elements A21 ... A27. Since stop pulses A17 and A27 have the same length as the other unit elements A11 to A16 or A21 to A26, respectively, a signal component F17 or F27 corresponds exactly to stop pulses A17 or A27, respectively. In contrast therewith, it has been assumed that stop pulse A19 is substantially longer than start pulse A18 and the other information unit elements, so that the two signal components F19 and F19' correspond to this longer stop pulse A19.

As shown in FIG. 2, the TDM signal F is applied to bistable circuit K1 which is timed with signal T1 of the clock generator TG shown in FIG. 1. The pulses of signal T1 appear, for example, in the middle of signal components F11, F12, F13 so that signal E is emitted via output e of bistable circuit KL. The unit elements of signal E (E11, E12, E13, E14, E15, E16, E17) correspond one after another to unit elements A11 to A17 of signal A1.

It is first assumed that prior to time slot $t0$ the word 11111111 is stored in cells I to VIII of shift register SR so that signal S7=1 is delivered to gate G1 from storage cell VII. Gate G1 is opened at time slot $t0$ with signal E=1, and signal H=1 is applied to parallel inputs $p$, thereby setting cells I to VIII to their zero conditions. This causes the latter to store the word 00000000. After time slot $t0$, a one signal is applied to serial input $s$ with signal H=0 and with inverter IN, so that one signals are read in serially at the subsequent time slots. For example, at time slot $t1$ the word 10000000 is stored, at time slot $t2$ the word 11000000 and at time slot $t7$ the word 11111110, so that signal S7=0 is briefly produced. Gate G1 is opened with signals E18=1 and S7=1, and it again delivers signal H=1 to parallel inputs $p$, so that after time slot $t7$ the same words are stored in the shift register as after time slot $t0$. Starting from the word 00000000, one values are again input continuously via input $s$ until at time slot $t14$ a one value is likewise stored in storage cell VII and signal S7=1 is produced. However, in contrast with the events at interval $t7$ there is now at time slot $t14$ the signal E=0, so that gate G1 does not open and with signal H=0 a further one value is read into storage cell I. Not until time slot $t16$ is gate G1 opened with signals S7=1 and E=1 and with signal H=1 the word 00000000 is again read into cells I to VIII. From time slot $t14$ to time slot $t16$ it is signalled through signal S7=1 that presently there are two stop pulses E19 and E19' corresponding to the longer stop pulse A19.

Since in shift register SR, until time slot $t0$, the word 11111111 has been stored in accordance with the requirement that signal S8=1 is emitted via the output of storage cell VIII. Counter reading 1000 in counter ZL is set with signal S8=1, counter reading 0100 is reached with signal H=1 at time slot $t0$ and counter reading 0010 is reached at time slot $t7$. These counter readings are shown in FIG. 3 with the diagram ZL and they are signalled by signals Z11, Z12, Z13, Z14. For example, prior to time slot $t0$ counter reading 1000 is signalled with signals Z11=1, Z12=0, Z13=0, and Z14=0. Gates G11, G12, G13 and G14 are controlled with signals Z11, Z12, Z13, Z14, and in this way one of the signals T11, T12, T13, T14 is applied to gate G2 at a time. From the output of gate G2 signal T3 is produced. For example, from time slot $t0$ to time slot $t7$ counter reading 0100 is signalled with signal Z12 and signal T12 is applied to gate G2. However, at time slot $t7$ the counter reading changes and counter reading 0010 is signalled with signal Z13=1 and signal T13 is allowed to pass through to gate G2. In this way a positive pulse edge of signal T3 is obtained not at time slot $t8$ but later at time slot $t9$. Since the single unit elements of signal E are transferred with the positive pulse edges of signal T3 in bistable circuit K2, stop pulse Q17 is obtained which is longer than the other unit elements Q11 to Q16. Thus, if with signal E a stop pulse E17 is offered which is as long as the other unit elements E11 to E16, then a longer stop pulse Q17 is produced with the channel unit KE1 shown.

After time slot $t9$, counter reading 0010 is set until time slot $t16$. This counter reading is signalled with signal Z13=1, as a result of which signal T13 is allowed to pass through to gate G2. At time slot $t16$ the counter reading is reset to counter reading 1000 with signal S8=1. This counter reading 1000 is signalled with signal Z11=1, which results in signal T11 being allowed to pass through to gate G2. In this way, a forward-shifted positive pulse edge is obtained at time slot $t16$ with signal T3. This positive pulse edge triggers the next start pulse of signal Q. At time slots, $t13$, $t15$ stop pulses E19 and E19' are sampled, yielding stop pulse Q19, which is shorter than the combined signal components E19 and E19' but is still longer than the other unit elements Q11 to Q16. Stop pulse Q19 is approximately as long as stop pulse Q17, so that two stop pulses Q17 and Q19 of substantially the same length are obtained from a reduced stop pulse E17 and an extended stop pulse E19+E19'.

The principles of the invention are described hereinabove by describing a preferred embodiment constructed accordingly. The described embodiment is to be considered only as being exemplary, and it can be modified or changed without departing from the scope of the invention as defined by the appended claims.

I claim:

1. In a data transmission system having a switching arrangement for extending the receiver stop pulse length for time division multiplex (TDM) transmissions of telegraph signals on a character frame basis, each character frame having a start pulse, a number m code bits and one stop pulse, wherein a TDM signal is applied to a first bistable circuit and the output of the first bistable circuit is applied to a second bistable circuit from which a data signal is emitted to a data sink, the improvement comprising:

shift register means having at least a number $m+3$ storage cells, parallel input terminals receiving a stop signal, a clock pulse input terminal receiving clock pulses to be applied to said shift register means and a serial input terminal receiving a second binary digit whenever no stop signal is present, gate means having input terminals for receiving an output signal from the $m+3$th storage cell of said shift register means and an output signal from said first bistable circuit, the gate means having an output terminal for producing stop signal, counter means for receiving said stop signal as a signal to be counted and the output signal from the $m+3$th storage cell of said shift register means as a reset signal, said counter means producing counter reading signals for indicating the reading of said counter means and means for producing phase shifted clock signals one of which is used as a function of the reading of said counter means for timing said second bistable circuit.

2. The improved switching arrangement defined in claim 1 wherein $n$ counter reading signals of said counter means indicate the counter reading in the 1-out-of-$n$ code and further comprising:

other gate means, each having first input terminals for receiving said counter reading signal and second input terminals for receiving said phase shifted clock signals and means for combining the outputs of said other gates into one additional clock signal which serves to time said second bistable circuit.

* * * * *